(12) United States Patent
Wang et al.

(10) Patent No.: US 10,943,145 B2
(45) Date of Patent: Mar. 9, 2021

(54) IMAGE PROCESSING METHODS AND APPARATUS, AND ELECTRONIC DEVICES

(71) Applicant: BEIJING SENSETIME TECHNOLOGY DEVELOPMENT CO., LTD., Beijing (CN)

(72) Inventors: Fei Wang, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 99 days.

(21) Appl. No.: 16/451,334

(22) Filed: Jun. 25, 2019

(65) Prior Publication Data

US 2019/0311223 A1 Oct. 10, 2019

Related U.S. Application Data

(63) Continuation of application No. PCT/CN2018/078810, filed on Mar. 13, 2018.

(30) Foreign Application Priority Data

Mar. 13, 2017 (CN) .......................... 2017 1 0145253

(51) Int. Cl.
*G06K 9/62* (2006.01)
*G06K 9/68* (2006.01)
(Continued)

(52) U.S. Cl.
CPC ........... *G06K 9/6232* (2013.01); *G06K 9/325* (2013.01); *G06K 9/6289* (2013.01);
(Continued)

(58) Field of Classification Search
CPC ...... G06K 9/46; G06K 9/4633; G06K 9/4671; G06K 9/4676; G06K 9/6228;
(Continued)

(56) References Cited

U.S. PATENT DOCUMENTS

| 9,641,795 B2 | 5/2017 | Urban et al. | ............. H04N 7/01 |
| 2010/0266198 A1* | 10/2010 | Kim et al. | ............. G06T 7/285 |
| | | | 382/154 |

(Continued)

FOREIGN PATENT DOCUMENTS

| CN | 101697593 A | 4/2010 | ............... H04N 7/36 |
| CN | 101866422 A | 10/2010 | ............... G06K 9/46 |

(Continued)

OTHER PUBLICATIONS

Machine translation of CN 103996185 A (Year: 2014).*

(Continued)

*Primary Examiner* — Andrew W Johns
(74) *Attorney, Agent, or Firm* — Syncoda LLC; Feng Ma

(57) ABSTRACT

Image processing methods, apparatuses, and electronic devices include: extracting features of an image to be processed to obtain a first feature map of the image; generating an attention map of the image based on the first feature map; fusing the attention map and the first feature map to obtain a fusion map; and extracting the features of the image again based on the fusion map. The implementation mode introduces an attention mechanism into image processing, and effectively improves the efficiency of acquiring information from an image.

20 Claims, 10 Drawing Sheets

(51) Int. Cl.
*G06T 7/10* (2017.01)
*G06K 9/32* (2006.01)

(52) U.S. Cl.
CPC ......... *G06K 9/6298* (2013.01); *G06K 9/6857* (2013.01); *G06T 7/10* (2017.01); *G06K 2209/21* (2013.01)

(58) Field of Classification Search
CPC .. G06K 9/6232; G06K 9/6261; G06K 9/6288; G06K 9/6289; G06K 9/629; G06K 9/6298; G06T 3/40; G06T 3/4007; G06T 3/4023; G06T 3/4046; G06T 2207/20016; G06T 2207/20221
See application file for complete search history.

(56) References Cited

U.S. PATENT DOCUMENTS

| | | | | |
|---|---|---|---|---|
| 2014/0153651 | A1 | 6/2014 | Urban et al. | |
| 2017/0262996 | A1* | 9/2017 | Jain et al. | G06K 9/4671 |
| 2018/0096457 | A1* | 4/2018 | Sawides et al. | G06F 16/50 |
| 2020/0143194 | A1* | 5/2020 | Hou et al. | G06K 9/46 |

FOREIGN PATENT DOCUMENTS

| | | | | |
|---|---|---|---|---|
| CN | 101980248 | A | 2/2011 | ............... G06K 9/62 |
| CN | 103679718 | A | 3/2014 | ............... G06T 7/00 |
| CN | 103996185 | A | 8/2014 | |
| CN | 105228033 | A | 1/2016 | ......... H04N 21/8549 |
| CN | 106157319 | A | 11/2016 | ............... G06T 7/00 |
| CN | 106934397 | A | 7/2017 | |
| CN | 107729901 | A | 2/2018 | |

OTHER PUBLICATIONS

International Search Report in the international application No. PCT/CN2018/078810, dated Apr. 28, 2018.
English translation of the Written Opinion of the International Search Authority in the international application No. PCT/CN2018/078810, dated Apr. 28, 2018.
First Office Action of the Chinese application No. 201710145253.1, dated Jul. 31, 2019.
Krizhevsky A, Sutskever I, Hinton G.E. Imagenet classification with deep convolutional neural networks[C]//Advances in neural information processing systems. 2012: 1097-1105.
Szegedy C, Liu W, Jia Y, et al. Going deeper with convolutions[C]// Proceedings of the IEEE Conference on Computer Vision and Pattern Recognition. 2015: 1-9.
Deng J, Dong W, Socher R, et al. Imagenet: A large-scale hierarchical image database[C]//Computer Vision and Pattern Recognition, 2009. CVPR 2009. IEEE Conference on. IEEE, 2009: 248-255.
He K, Zhang X, Ren S, et al. Deep residual learning for image recognition[C]//Proceedings of the IEEE Conference on Computer Vision and Pattern Recognition. 2016: 770-778.
Chen L C, Yang Y, Wang J, et al. Attention to scale: Scale-aware semantic image segmentation[C]//Proceedings of the IEEE Conference on Computer Vision and Pattern Recognition. 2016: 3640-3649.
Ioffe S, Szegedy C. Batch normalization: Accelerating deep network training by reducing internal covariate shift[J]. arXiv preprint arXiv:1502.03167, 2015.
LeCun Y, Bengio Y, Hinton G. Deep learning[J]. Nature, 2015, 521(7553): 436-444.
Residual Attention Network for Image Classification, Fei Wang1, Mengqing Jiang2, Chen Qian1, Shuo Yang3, Cheng Li1, Honggang Zhang4, Xiaogang Wang3, Xiaoou Tang3, 1SenseTime Group Limited, 2Tsinghua University, 3The Chinese University of Hong Kong, 4Beijing University of Posts and Telecommunications , IEEE, 2017.

* cited by examiner

IMAGE PROCESSING METHODS AND APPARATUS, AND ELECTRONIC DEVICES

CROSS-REFERENCE TO RELATED APPLICATIONS

This is a continuation of International patent application No. PCT/CN2018/078810 filed on Mar. 13, 2018, which claims priority to Chinese Patent Application No. CN201710145253.1 filed on Mar. 13, 2017. The disclosures of these applications are incorporated herein by reference in their entirety.

TECHNICAL FIELD

The present disclosure relates to computer vision technologies, and in particular, to image processing methods and apparatus, and electronic devices.

BACKGROUND

Computer vision is a simulation of biological vision using computers and related equipment. In the field of computer vision, the visual attention mechanism has always drawn people's attention. Humans can quickly scan the entire area of the field of view by means of the visual attention mechanism, and filter out areas not related to a target object so as to only focus on the area where the target object is located. Therefore, the attention mechanism greatly improves the efficiency of acquiring information of target objects by human.

SUMMARY

Embodiments of the present disclosure provide technical solutions for image processing.

According to one aspect of the embodiments of the present disclosure, an image processing method is provided, and includes: extracting features of an image to be processed to obtain a first feature map of the image; generating an attention map of the image based on the first feature map; fusing the attention map and the first feature map to obtain a fusion map; and extracting features of the image again based on the fusion map.

According to another aspect of the embodiments of the present disclosure, an image processing apparatus is provided. The apparatus includes: a first feature extraction unit, configured to extract features of an image to be processed to obtain a first feature map of the image; an attention extraction unit, configured to generate an attention map of the image based on the first feature map; a fusion unit, configured to fuse the attention map and the first feature map to obtain a fusion map; and a second feature extraction unit, configured to extract features of the image again based on the fusion map.

According to still another aspect of the embodiments of the present disclosure, a non-transitory computer-readable storage medium is provided, which has computer instructions stored thereon, where execution of the computer-readable instructions by a processor causes the processor to implement the image processing method as described above.

According to yet another aspect of the embodiments of the present disclosure, an electronic device is provided, and includes: a processor and a memory for storing instructions executable by the processor; wherein the processor executes the instructions to implement the operations of the image processing method as described above.

According to yet another aspect of the embodiments of the present disclosure, a computer program is provided, and includes: a computer-readable code, where when the computer-readable code is run on a device, a processor in the device executes instructions for implementing the operations of the image processing method according to any one of the implementation modes of the present disclosure.

The following further describes in detail the technical solutions in the embodiments of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

Other features, objectives, and advantages of the present disclosure will become more apparent by reading the detailed description of non-limiting embodiments made with reference to the following accompanying drawings.

DETAILED DESCRIPTION

Figure 1:
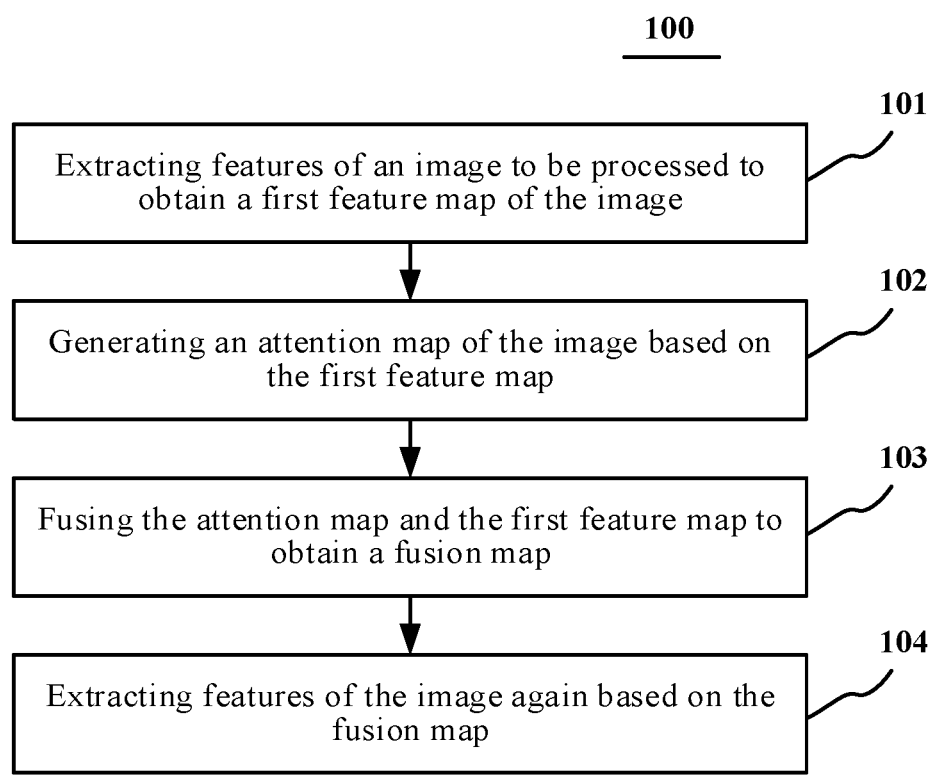
FIG. 1 is a flowchart of an embodiment of a method for detecting a target object according to the present disclosure.

The embodiments of the present disclosure are further described in detail below with reference to the accompanying drawings and the embodiments. It can be understood that the specific embodiments described here are only used for explain the related application, but are not intended to limit the embodiments of the present disclosure. In addition, it should be understood that, for ease of description, the size of at least one part shown in the accompanying drawings is not drawn in actual proportion.

Moreover, it should also be noted that, for ease of description, the accompanying drawings illustrate only the parts related to the embodiments of the relevant application.

It should be noted that the embodiments in the present disclosure and the features in the embodiments may be combined with each other in the case of no conflict. Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronic products, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer system/server may be practiced in the distributed cloud computing environments in which tasks are executed by remote processing devices that are linked through a communications network. In the distributed computing environments, the program modules may be located in local or remote computing system storage media including storage devices.

The following describes the present disclosure in detail with reference to the accompanying drawings in conjunction with the embodiments.

Referring to FIG. 1, a flow 100 of an embodiment of an image processing method according to the present disclosure is illustrated. The image processing method in this embodiment includes the following operations.

At block 101, features of an image to be processed are extracted to obtain a first feature map of the image.

In the embodiments of the present disclosure, the image to be processed may be an image including various objects, buildings, persons, and sceneries, or may be a static image, or may also be an image frame in a video. The extraction of the features of the image to be processed may be implemented by using one or more convolution layers in a neural network. The features of the image are extracted to obtain the first feature map of the image.

In an example, the operation of block 101 is performed by a processor by invoking a corresponding instruction stored in a memory, or is performed by a first feature extraction unit 701 run by the processor.

At block 102, an attention map of the image is generated based on the first feature map.

After the first feature map of the image to be processed is obtained, a series of processing is performed on the feature map to obtain the attention map of the image.

The series of processing is, for example, as follows: performing downsampling processing on the first feature map multiple times, performing downsampling processing and upsampling processing on the first feature map alternately, performing upsampling processing on the first feature map multiple times after performing the downsampling processing multiple times, and performing convolution or average pooling on the first feature map, etc. The approach for generating the attention map based on the feature map may adopt any one of the methods provided below in the embodiments of the present disclosure, and may also adopt other existing methods for generating the attention map based on the attention mechanism. The embodiments of the present disclosure are not limited thereto. The attention map generated by the attention mechanism based on a computer vision technology includes global information of the image to be processed; as the global information further includes weight information of features that the attention focuses on, a human vision system is simulated, and focus is placed on the feature information with a large weight in the image without losing the global information of the image.

In an example, the operation of block 102 is performed by a processor by invoking a corresponding instruction stored in a memory, or is performed by an attention extraction unit 702 run by the processor.

At block 103, the attention map and the first feature map are fused to obtain a fusion map.

After the attention map and the first feature map are obtained, the two are fused to obtain effective information including objects, persons, and sceneries in the image to be processed, that is, the information about objects, persons, sceneries and the like in the image to be processed is more effectively expressed by using the fusion map.

In an example, the operation of block 103 may be executed by a processor by invoking a corresponding instruction stored in a memory, or may be executed by a fusion unit 703 run by the processor.

At block 104, features of the image are extracted again based on the fusion map.

In the embodiments of the present disclosure, after the fusion map is obtained, the features of the map may be extracted again, and the obtained features may be further applied. The features of the image may be extracted again by using a plurality of cascaded convolution layers or residual units.

In an example, the operation of block 104 is performed by a processor by invoking a corresponding instruction stored in a memory, or is performed by a second feature extraction unit 704 run by the processor.

In an example, the image processing method in the embodiments of the present disclosure may be implemented by a neural network. It can be understood that, in order to better extract the features of the images to be processed, the neural network may be repeated multiple times to form a deeper neural network. In this way, more comprehensive global information of the image to be processed can be obtained, thereby improving the feature expression capability of the image to be processed.

It can be understood that, before the use of the neural network, the neural network may be trained using a picture with annotation information, and the training result is back-propagated to modify the parameters of the neural network, so as to complete the training of the neural network, thereby obtaining the above neural network.

According to the image processing method provided by the above embodiment, features of an image to be processed are extracted first, to obtain a first feature map of the image, an attention map of the image is generated based on the first feature map, the attention map and the first feature map are then fused, and finally, the features of the image are extracted again based on the fusion map, so that an attention mechanism is introduced into image processing, and the efficiency of acquiring information from the image is effectively improved.

Figure 2:
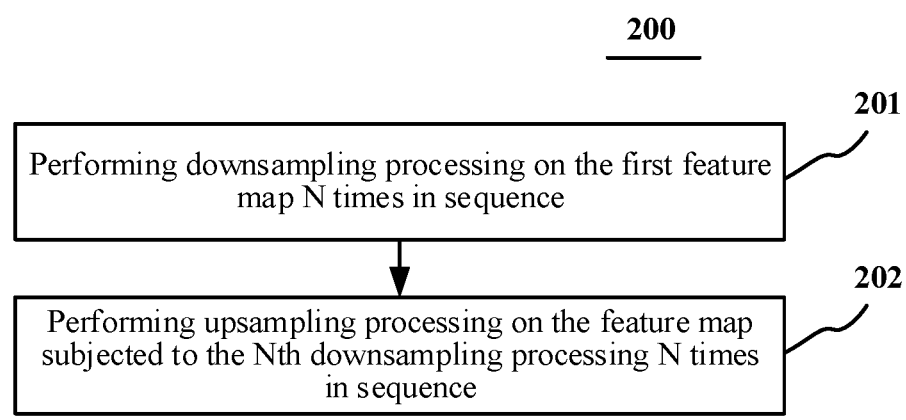
FIG. 2 is a flowchart diagram illustrating the generation of an attention map in a method for detecting a target object according to the present disclosure.

Referring to FIG. 2, a flow 200 of generating an attention map in an image processing method according to the present disclosure is illustrated. As shown in FIG. 2, the attention map of the image to be processed is generated through the following operations.

At block 201, downsampling processing is performed sequentially on the first feature map N times.

In the embodiments of the present disclosure, N is an integer and N≥1. Global information of the first feature map is obtained by performing downsampling processing on the first feature map obtained in block 101. However, the more times the downsampling is performed, the larger the difference between the dimension of an obtained global information map and the dimension of the first feature map is. In this embodiment, the downsampling operation may be implemented by, but not limited to, using pooling layers with different step sizes, convolution layers with different step sizes, and an average pooling layer to perform the downsampling operation. For example, when a pooling layer with a step size of 2 is used to perform downsampling on the first feature map, the resolution of the first feature map is assumed to be 224×224. After three times of downsampling, the resolution of the obtained feature map is 28×28. Since the resolution of the feature map obtained by performing downsampling N times is different from that of the first feature map, although the feature map obtained by performing downsampling N times includes the global information of the first feature map, the feature map cannot guide the learning of the feature with a resolution of 224×224.

In an example, the operations of block 201 may be executed by a processor by invoking a corresponding instruction stored in a memory, or may be executed by a downsampling unit run by the processor.

At block 202: upsampling processing is performed sequentially on the feature map subjected to the $N^{th}$ downsampling processing N times to obtain the attention map of the image.

In this embodiment, after the feature map subjected to N times of downsampling processing is obtained, upsampling processing is performed on the feature map N times. Thus, the resolution of the feature map subjected to N times of upsampling processing is the same as the resolution of the first feature map. In this embodiment, the upsampling operation can be implemented by, but not limited to, using a deconvolution layer, a nearest neighbor interpolation layer, and a linear interpolation layer to perform an upsampling operation. For example, after three times of downsampling, the resolution of the obtained feature map is 28×28, and then after three times of upsampling processing is performed on the feature map, the resolution of the attention map obtained is the same as the resolution of the first feature map.

In some implementation modes of this embodiments, after each downsampling and each upsampling processing, a convolution operation is also performed on the feature map obtained by the downsampling processing and the feature map obtained by the upsampling processing. After the convolution operation is performed on the feature map obtained by the upsampling processing, the next upsampling processing is then performed. That is, the convolution operation is performed on the feature map subjected to the $(N-n)^{th}$ downsampling processing and the feature map subjected to the $n^{th}$ upsampling processing; and the $(n+1)^{th}$ upsampling processing is performed on the feature map subjected to the convolution operation, where n is a positive integer and 1<n<N.

In an example, the operations of block 202 may be executed by a processor by invoking a corresponding instruction stored in a memory, or may be executed by an upsampling unit run by the processor.

It can be understood that, in this implementation mode, the $N^{th}$ upsampling processing is performed after the convolution operation is performed on the feature map obtained by the $(N-1)^{th}$ upsampling processing. The convolution operation in this implementation mode may be implemented by using a convolution layer, or may be implemented by using a residual unit. No limitation is made thereto in this implementation mode. The residual unit may be a network structure including two or more convolution layers.

According to the image processing method in this implementation mode, not only the resolution of the attention map is the same as the resolution of the first feature map, but also the obtained attention map may be used to guide the subsequent learning of the features in the first feature map. In addition, by performing a convolution operation on the obtained feature map after each downsampling processing and upsampling processing, the features in the feature maps in different dimensions can be better learned.

In some implementation modes of this embodiment, the performing a convolution operation on the feature map subjected to the $(N-n)^{th}$ downsampling processing and the feature map subjected to the $n^{th}$ upsampling processing may also be implemented through the following operations:

convolution processing is performed on the feature map subjected to the $(N-n)^{th}$ downsampling processing to obtain a convolution map; the feature value of at least one pixel (for example, each pixel) in the convolution map is added to the feature value of the corresponding pixel in the feature map subjected to the $n^{th}$ upsampling processing; and a convolution operation is performed on the feature map subjected to the addition (i.e., obtained by the addition).

In this implementation mode, n is a positive integer and 1<n<N. N may be a preset value or a value calculated according to the resolution of the first feature map, and the value of N may be determined through the following calculation method: setting the minimum resolution of the feature map obtained by the downsampling processing, and the number of times downsampling can be performed is determined according to the resolution of the first feature map and the minimum resolution, that is, the value of N is determined. For example, the resolution of the first feature map is 56×56, and the set minimum resolution is 7×7. After each downsampling operation, the resolution of the obtained feature map is reduced to one quarter of that of the feature map before the downsampling, and then the value of N is determined to be at most 3.

Because in this implementation mode, N times of downsampling processing is performed on the first feature map, and then N times of upsampling processing is performed thereon, feature maps having the same resolution are obtained during the process of the downsampling processing and during the process of the upsampling processing. In order to obtain a deeper lever of information of the image to be processed, convolution processing is performed on the feature map subjected to the $(N-n)^{th}$ downsampling processing to obtain the convolution map. Afterwards, the feature value of at least one pixel in the convolution map is added to the feature value of the corresponding pixel in the feature map subjected to the $n^{th}$ upsampling processing, and then a convolution operation is performed on the feature map subjected to the addition.

According to the image processing method in this implementation mode, a deeper level of information of the image to be processed is obtained by adding the features maps having the same resolution obtained during the process of the downsampling processing and during the process of the upsampling processing.

In some implementation modes of this embodiment, when upsampling processing is performed on the feature map subjected to the $N^{th}$ downsampling processing N times in sequence, the following operations may also be included: performing at least one convolution operation on the feature map subjected to the $N^{th}$ downsampling processing, and performing the first upsampling processing on the feature map subjected to the last convolution operation.

In this implementation mode, after the last downsampling processing, a convolution operation is performed on the obtained feature map to obtain a global information map, then the convolution operation is performed on the global information map again, and subsequently, the first upsampling processing is performed on the feature map subjected to the convolution operation again. In this way, the process of the downsampling processing and the process of the upsampling processing are two symmetric processes, and the finally obtained attention map is more capable of reflecting the feature information contained in the image to be processed.

Figure 3A:
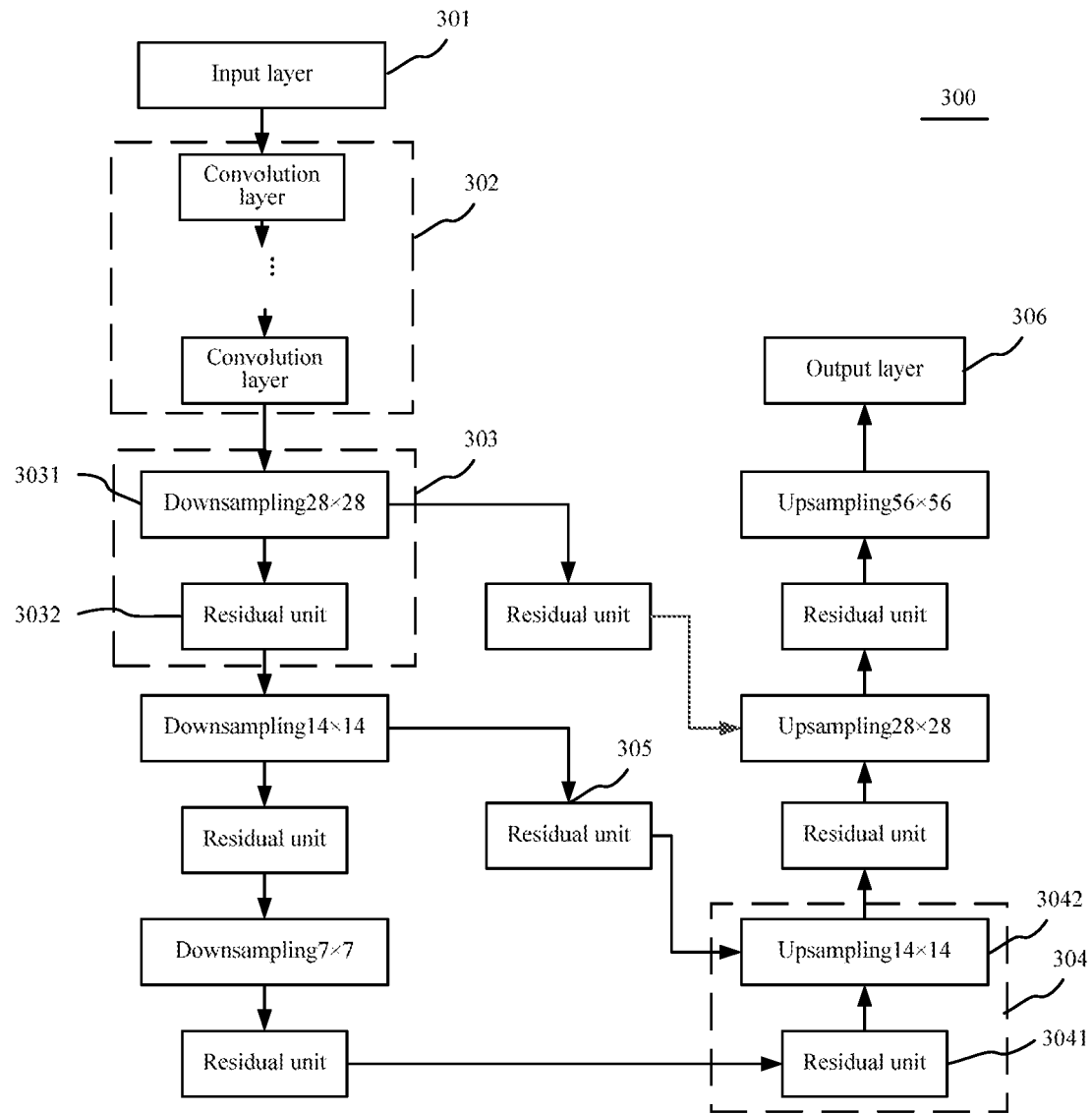
FIG. 3A is a schematic diagram of a network structure corresponding to the flow illustrated in FIG. 2.

In an example, the image processing method in this implementation mode may be implemented by using the network structure shown in FIG. 3A. As shown in FIG. 3A, the network structure in this implementation mode includes an input layer 301, a plurality of cascaded convolution layers 302, a plurality of downsampling units 303, a plurality of upsampling units 304, a plurality of residual units 305, and an output layer 306. It can be understood that the convolution operation in this implementation mode is implemented by the residual units.

The input layer 301 is configured to input an image to be processed. The plurality of cascaded convolution layers 302 is configured to extract features of the image to be processed to obtain a first feature map. It can be understood that the plurality of cascaded convolution layers 302 may also be implemented by the residual units.

Each downsampling unit 303 includes a downsampling layer 3031 and a residual unit 3032. The downsampling layer 3031 is configured to perform downsampling processing on the first feature map obtained by the plurality of cascaded convolution layers 302. The resolution of the feature map obtained by every downsampling processing is equivalent to one quarter of the resolution of the first feature map. Each residual unit 3032 is configured to perform, after each downsampling processing, a convolution operation on the feature map subjected to the downsampling processing, so as to extract the features of the feature map subjected to the downsampling processing. For example, the resolution of the first feature map is 56×56. After one time of downsampling processing performed by the downsampling layer 3031, the resolution of the obtained image is 28×28, and the residual unit 3032 extracts the features of the 28×28 image. If the network structure includes three downsampling units 303, the resolution of the feature map obtained through processing by the third downsampling unit is 7×7, and the residual unit of the third downsampling unit extracts the features of the 7×7 image, thereby obtaining a global information map of the first feature map. It can be understood that the number of the downsampling units 303 in the network structure may be arbitrary, and no limitation is made thereto in this implementation mode. In addition, it can be understood that the structure of the residual unit in each downsampling unit may be the same, i.e., including the same number of convolution layers, but the parameters of each convolution layer are different.

After the global information map of the first feature map is obtained, the upsampling unit 304 is used to continue processing the global information map. The upsampling unit 304 may include one residual unit 3041 and an upsampling layer 3042. The residual unit 3041 and the residual unit 3032 are the same in structure but different in parameters. The residual unit 3041 is configured to extract the features of the global information map obtained by the residual unit 3032. After the above features are extracted, the resolution of the feature map obtained by the upsampling processing of the upsampling layer 3042 is four times the resolution of the global information map. Upon upsampling processing the same number of times as the downsampling does, the resolution of the finally obtained attention map is the same as the resolution of the first feature map.

Figure 3B:
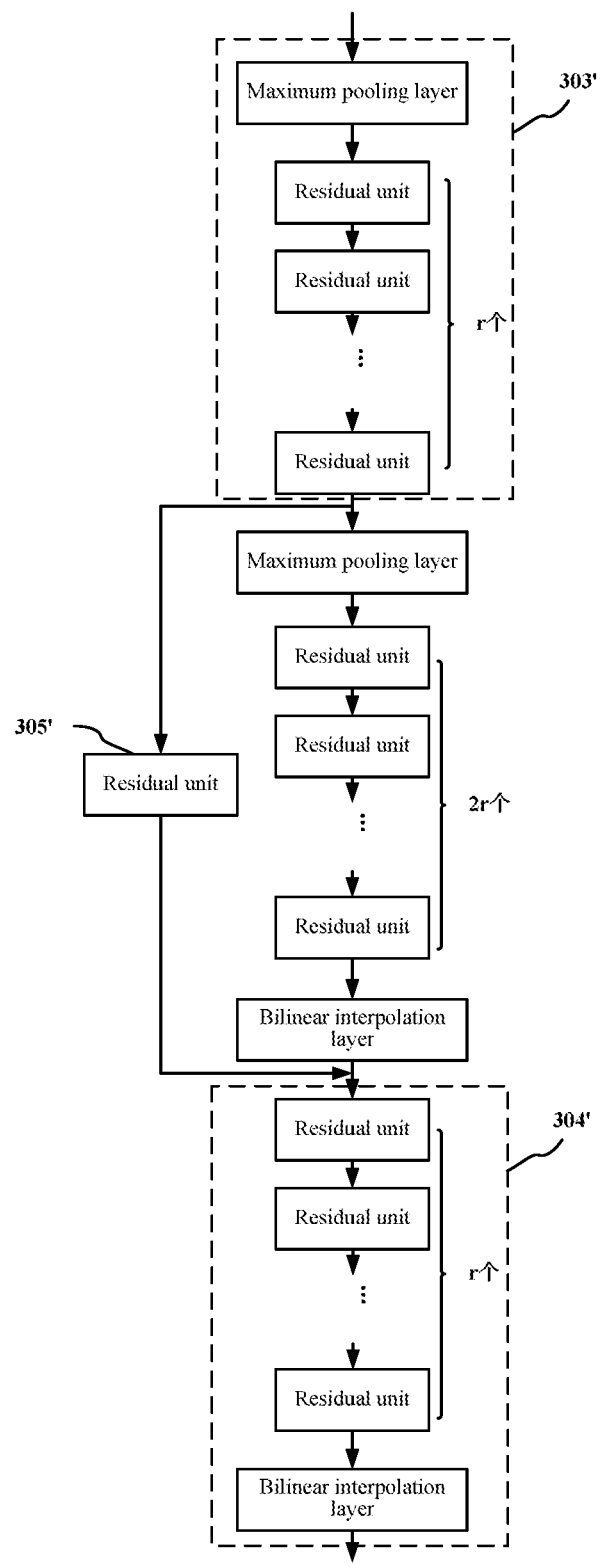
FIG. 3B is a schematic diagram of another network structure corresponding to the flow illustrated in FIG. 2.

It can be understood that, in FIG. 3A, the downsampling layer in the downsampling unit 303 is implemented through a maximum pooling layer, and the upsampling layer in the upsampling unit 304 is implemented through a bilinear interpolation layer. In addition, each downsampling unit 303 and upsampling unit 304 may further include a plurality of residual units. Referring to FIG. 3B, a downsampling unit 303' includes a maximum pooling layer and r cascaded residual units; an upsampling unit 304' includes r cascaded residual units and an interpolation layer; and 2r cascaded residual units are included between the last maximum pooling layer and the first bilinear interpolation layer, as shown in FIG. 3B. Moreover, the feature maps having the same resolution obtained during the process of the upsampling processing and during the process of the downsampling processing may be added after convolution by one residual unit. Therefore, one residual unit 305' is connected before the last maximum pooling layer and behind the first bilinear interpolation layer. Where, r is an integer greater than or equal to 1.

Since during the processes of downsampling and upsampling, the feature maps having the same resolution are obtained, for example, feature maps having resolutions of 28×28, 14×14 and 7×7 are obtained during the process of downsampling, similarly, feature maps having resolutions of 14×14, 28×28, and 56×56 are obtained during the process of upsampling. The feature having the resolution of 14×14 obtained during the process of downsampling is processed by one residual unit 305 and then added to the feature value of the corresponding pixel in the feature map having the resolution of 14×14 obtained during the process of upsampling, for subsequent upsampling; the feature map having the resolution of 28×28 obtained during the process of downsampling is processed by one residual unit 304 and then added to the feature value of the corresponding pixel in the feature map having the resolution of 28×28 obtained during the process of upsampling, for subsequent upsampling. Through such processing, multi-scale features of objects included in the image to be processed are captured, and the intensity of the features of at least one object that attention is focused on is enhanced, thereby suppressing the intensity of the features of other objects that the attention is not focused on.

Figure 4:
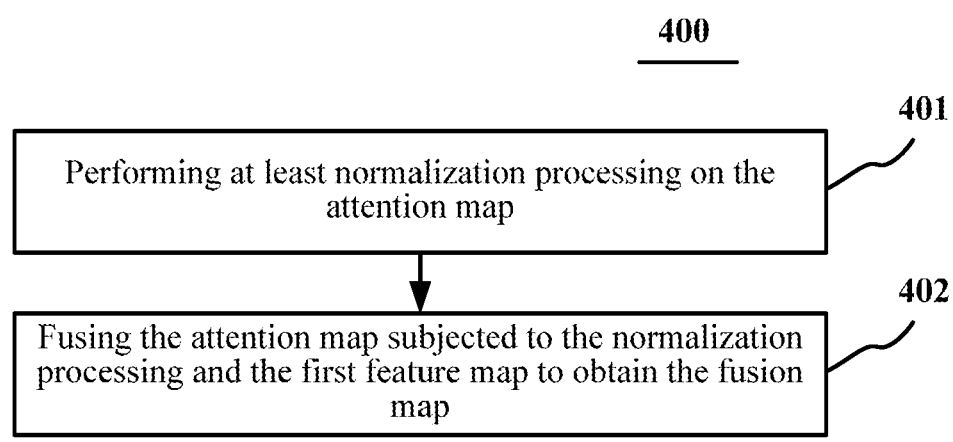
FIG. 4 is a flowchart diagram illustrating the fusion of an attention map and a first feature map in the method for detecting a target object according to the present disclosure.

Referring to FIG. 4, a flow 400 of fusing an attention map and a first feature map in an image processing method according to the present disclosure is illustrated. As shown in FIG. 4, the fusion operation of this embodiment may be implemented through the following operations.

At block 401, at least normalization processing is performed on the attention map.

In this embodiment, normalization processing is performed on the attention map, and the weight value of at least one pixel (for example, each pixel) in the attention map may be limited to [0, 1]. The above normalization operation, for example, is implemented through a sigmoid function, and the sigmoid function is a threshold function of a neural network and may map a variable to [0, 1].

In an example, the operations of block 401 may be performed by a processor by invoking a corresponding instruction stored in a memory, or may be performed by a normalization unit run by the processor.

At block 402: the attention map subjected to the normalization processing and the first feature map are fused to obtain a fusion map.

After the normalization processing is performed on the attention map, the attention map subjected to the normalization processing and the first feature map are then fused to obtain the fusion map.

In this embodiment, by performing a normalization operation on the attention map, on one hand, subsequent data processing is facilitated, and on the other hand, the subsequent data processing is promoted to obtain a more accurate result.

In an example, the operations of block 104 may be executed by a processor by invoking a corresponding instruction stored in a memory, or may be executed by a fusion unit 703 run by the processor.

In some implementation modes of this embodiment, before the normalization processing is performed on the attention map in block 401, at least one convolution processing may be first performed on the attention map, and then the normalization processing is performed on the attention map subjected to the last convolution processing. In an example, the foregoing operation may be executed by a processor by invoking a corresponding instruction stored in a memory, or may be executed by a second convolution unit and the normalization unit run by the processor.

In an example, the convolution operation may be implemented by a convolution layer. According to one or more examples of the present disclosure, the convolution kernel of the convolution layer may be set to 1×1, whereby the expression capability of the features included in the attention map may be enhanced.

In some implementation modes of this embodiment, when the attention map and the first feature map are fused in block 402, a weight value of at least one pixel (for example, each pixel) in the attention map subjected to the normalization processing is multiplied by a feature value of the corresponding pixel in the first feature map to obtain the fusion map. In an example, the above operation may be executed by a processor by invoking a corresponding instruction stored in a memory, or may be executed by the fusion unit 703 run by the processor.

In this implementation mode, because the resolution of the attention map is the same as that of the first feature map, at least one pixel in the attention map may be correspond one-to-one to at least one pixel in the first feature map. Moreover, the weight value of at least one pixel in the attention map is subjected to the normalization processing in block 401, so the weight value subjected to the normalization processing may be fused with the feature value of the corresponding pixel in the first feature map by using a multiplication method, and the obtained multiplication map is used as the fusion map.

In some implementation modes of this embodiment, after the multiplication map is obtained in block 402, the feature value of the at least one pixel in the obtained multiplication map is added to the feature value of the corresponding pixel in the first feature map, and the feature map obtained by the addition is used as the fusion map. In an example, the above operation may be executed by a processor by invoking a corresponding instruction stored in a memory, or may be executed by the fusion unit 703 run by the processor.

Since the obtained multiplication map contains the feature information in the image to be processed, the feature information may be referred to as useful information. Moreover, both the processing on the attention map and the processing on the feature map reduce the signal intensity of the feature information in the image to be processed, that is, the feature value of the at least one pixel in the first feature map is reduced. The attenuation of the signal intensity is not conducive to the learning of the features by the neural network, and the attenuation of the useful information directly influences the feature learning capability of the neural network.

In this implementation mode, by adding the feature value of the at least one pixel in the multiplication map to the feature value of the corresponding pixel in the first feature map, on one hand, the proportion of the useful information in the feature value of the at least one pixel of the entire fusion map may be increased, equivalent to suppressing other information than the useful information, and on the other hand, the attenuation of the signal intensity may also be avoided.

Figure 5A:
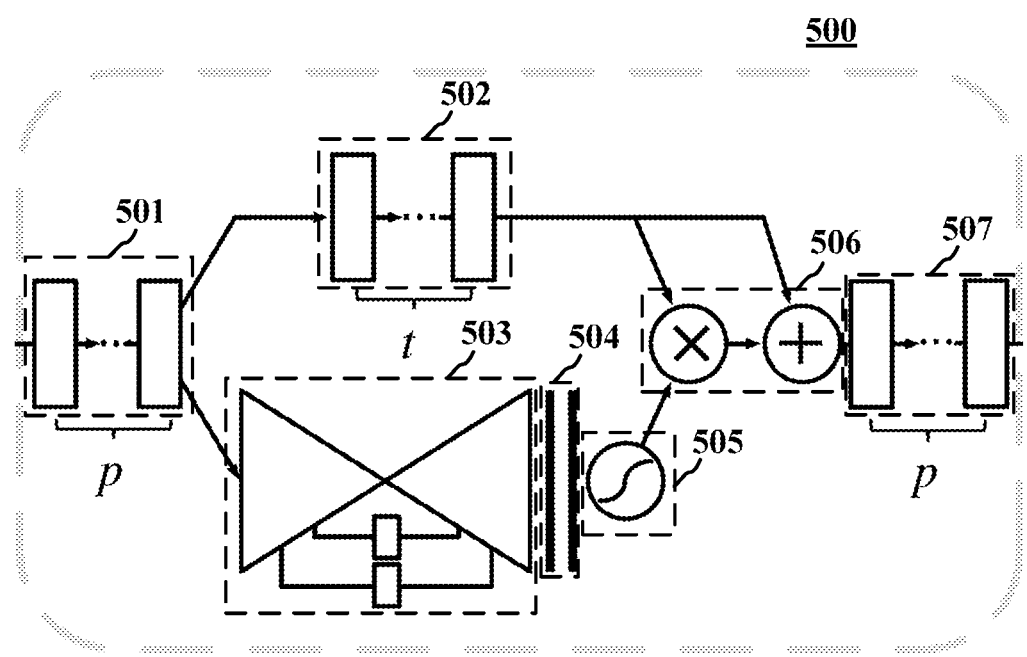
FIG. 5A is a schematic structural diagram of a neural network corresponding to the flow illustrated in FIG. 4.

On the basis of the network structure shown in FIG. 3, and in combination with the solution described in the embodiment shown in FIG. 1, the structure of the neural network of this embodiment may be obtained, as shown in FIG. 5A. In FIG. 5A, a neural network 500 includes a first feature extraction unit 501, a first convolution unit 502, an attention extraction unit 503, a second convolution unit 504, a normalization unit 505, a fusion unit 506, and a second feature extraction unit 507. The first feature extraction unit 501, the first convolution unit 502, and the second feature extraction unit 507 are all formed by a plurality of residual units. The first feature extraction unit 501 includes p cascaded residual units. The first convolution unit 502 includes t cascaded residual units. The second feature extraction unit 507 includes p cascaded residual units. Where, p and t are integers greater than 1.

The function of the first feature extraction unit 501 is equivalent to that of the plurality of cascaded convolution layers 302 in FIG. 3, i.e., extracting features of an image to be processed to obtain a first feature map. The first convolution unit 502 may further extract the features of a first feature map. The function of the attention extraction unit 503 is equivalent to that of the plurality of downsampling units 303, the plurality of upsampling units 304, and the plurality of residual units 305 in FIG. 3, i.e., obtaining an attention map. The second convolution unit 504 is configured to perform at least one convolution operation on the first feature map before normalization processing is performed on the attention map. The normalization unit 505 is configured to perform normalization processing on the attention map. The fusion unit 506 is configured to fuse the attention map subjected to the normalization processing and the first feature map to obtain a fusion map. The second feature extraction unit 507 is configured to extract the features of the fusion map again.

Figure 5B:
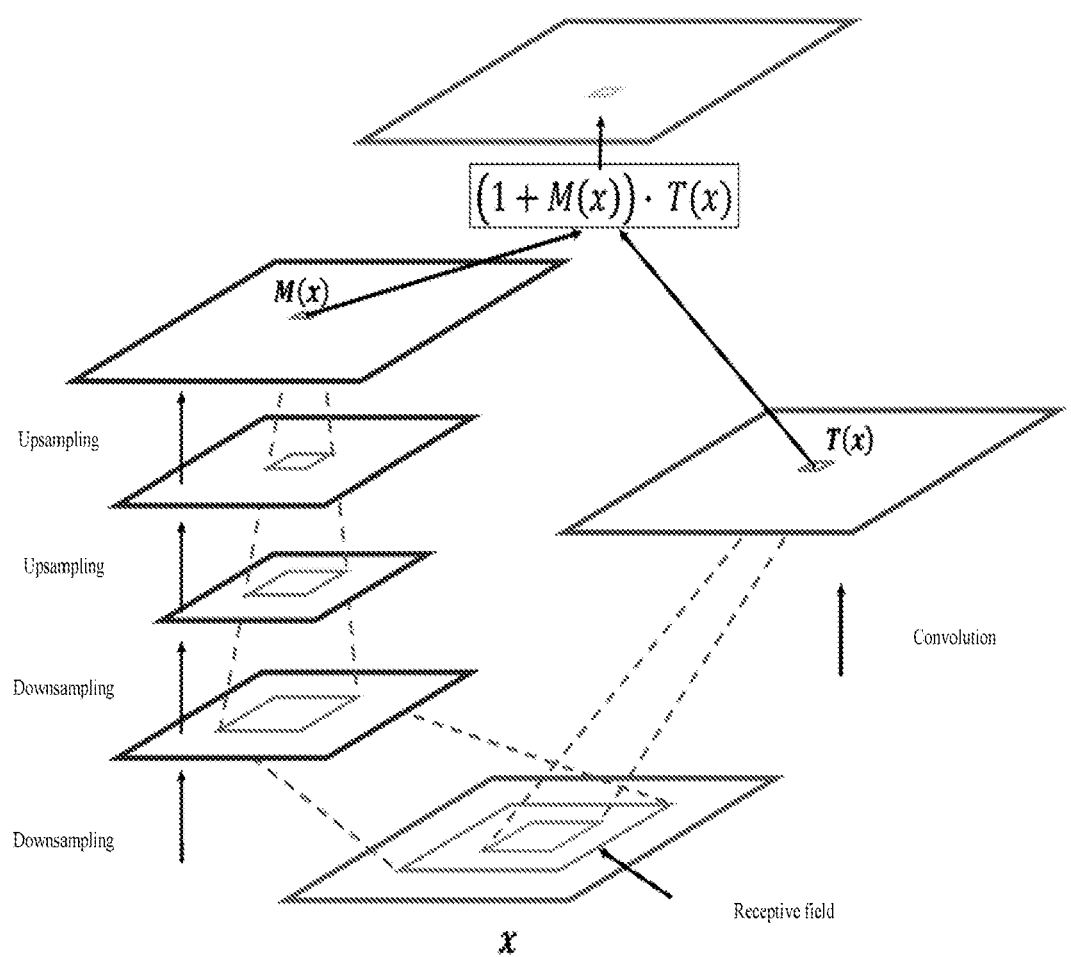
FIG. 5B is a schematic diagram of a processing process of the neural network illustrated in FIG. 5A.

The process of processing the neural network shown in FIG. 5A may refer to FIG. 5B. As shown in FIG. 5B, the input feature, i.e., the first feature map, is represented by x. A receptive field of the attention extraction unit 503 and a receptive field of the first convolution unit 502 shown in FIG. 5A respectively simulate the attention of human vision. The left branch in FIG. 5B is equivalent to the attention extraction unit 503, and the right branch is equivalent to the first convolution unit 502.

The left branch in FIG. 5B includes two downsampling operations and two upsampling operations. Upon the first downsampling, the resolution of the obtained feature map is one quarter of the resolution of the first feature map x; upon the second downsampling, the resolution of the obtained feature map is one sixteenth of the resolution of the first feature map x; and then, upon the first upsampling processing, the obtained feature map has the same resolution as the feature map obtained after the first downsampling processing; upon the second upsampling processing, the obtained feature map has the same resolution as the first feature map. In addition, after the two times of downsampling processing and the two times of upsampling processing, that is, after traversing the entire feature map, the weight M(x) of the feature that attention is focused on in the image is determined.

The right branch in FIG. 5B includes performing a convolution operation on the first feature map x to obtain a feature T(x).

Finally, the obtained weight M(x) is fused with the feature T(x) to obtain the fusion map. The fusion map includes the fused feature $(1+M(x)) \cdot T(x)$.

Figure 6:
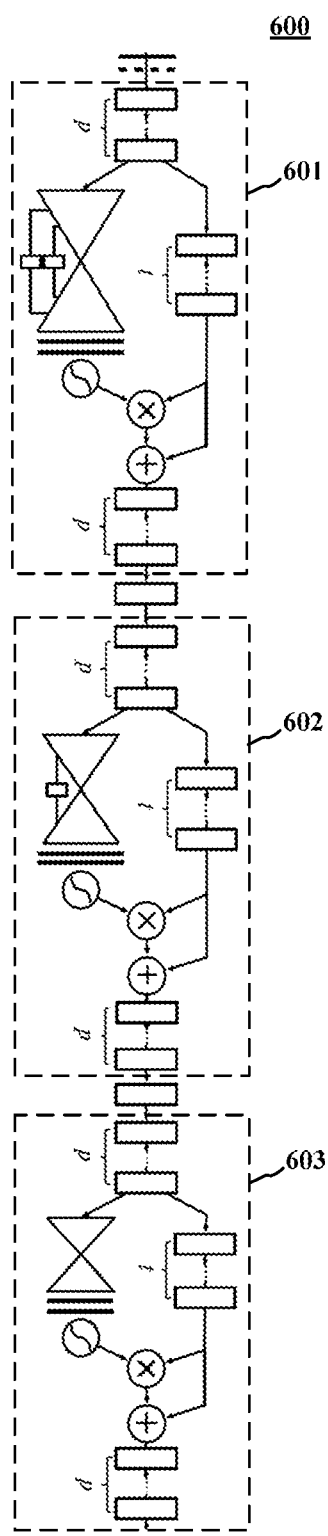
FIG. 6 is a schematic structural diagram of a deep convolutional neural network constituted by the neural network illustrated in FIG. 5A.

It can be understood that, in order to construct a deeper neural network, in an embodiment of the present disclosure, the neural network 500 may also be used as a sub-neural network and repeatedly executed multiple times, and sub-neural networks having different parameters may be stacked to obtain a deep convolutional neural network 600 as shown in FIG. 6. The deep convolutional neural network 600 may include a plurality of sub-neural networks. FIG. 6 exemplarily illustrates three sub-neural networks, which are a sub-neural network 601, a sub-neural network 602, and a sub-neural network 603. The parameters of each sub-neural network may be the same and may also be different. The parameters of the sub-neural network referred to here may include: the number of downsampling and upsampling operations in the attention extraction unit, the number of residual units in the first convolution unit, and the like. In addition, each sub-neural network may be repeated multiple times, for example, when at least one of the sub-neural network 601, the sub-neural network 602, and the sub-neural network 603 is different, the deep convolutional neural network 600 may include m sub-neural networks 601, k sub-neural networks 602, and j sub-neural networks 603, where m, k, and j are all positive integers.

The neural network constructed based on the image processing method proposed by this embodiment effectively reduces the number of parameters required for the training of the neural network in a neural network training process, thereby improving the feature learning efficiency. In addition, in the process of image processing based on the trained neural network, no parameter adjustment operation is required. Through the same number of downsampling and upsampling operations, the back propagation of the global information is achieved, thereby facilitating the transfer of the useful information that the attention is focused on.

In some implementation modes of this embodiment, the image to be processed may include a plurality of objects, and the plurality of objects may be the same type of objects, and may also be different types of objects. The above objects may belong to at least one category of objects, for example, may include various vehicles such as airplanes, bicycles, automobiles, and may also include various animals such as birds, dogs, and lions.

After the features of the image to be processed are extracted again based on the fusion map, the features extracted again may be utilized to detect and identify the objects included in the image.

Further, the features extracted again may also be utilized to determine the categories of the objects included in the image.

Further, the features extracted again may also be utilized to segment the image to separate the portion containing the objects.

According to the image processing method in this implementation mode, after the features of the image to be processed are extracted again, the features extracted again may be utilized to implement different applications, and may meet the image processing requirements of different tasks. For example, the objects included in the image may be detected and identified, and may be applied to an unmanned or blind guiding device. The objects included in the image may be classified, and may be applied to a detection device in the military field. The image may be segmented, and may be applied to further analysis of the objects.

Any image processing method provided in the embodiments of the present disclosure may be executed by any appropriate device having data processing capability, including, but not limited to, a terminal and a server, etc. Alternatively, any image processing method provided in the embodiments of the present disclosure may be executed by a processor, for example, any image processing method mentioned in the embodiments of the present disclosure is executed by the processor by invoking corresponding instructions stored in a memory. Details are not described below again.

A person of ordinary skill in the art may understand that all or some operations of implementing the forgoing embodiments of the method may be achieved by a program by instructing related hardware; the program can be stored in a computer readable storage medium; when the program is executed, steps including the foregoing embodiments of the method are executed. Moreover, the storage medium includes at least one medium capable of storing program code, such as ROM, RAM, a magnetic disk, or an optical disk.

As the implementation of the method shown in at least one of the above drawings, the present disclosure provides one embodiment of an image processing apparatus. The apparatus embodiment corresponds to the method embodiment shown in FIG. 1. The apparatus may be optionally applied to at least one electronic device.

Figure 7:
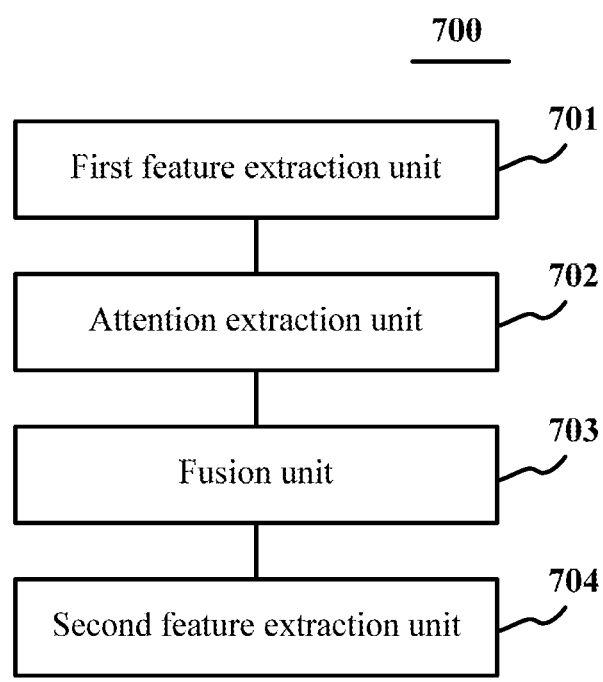
FIG. 7 is a schematic structural diagram of an embodiment of an image processing apparatus according to the present disclosure.

As shown in FIG. 7, the image processing apparatus 700 of this embodiment includes: a first feature extraction unit 701, an attention extraction unit 702, a fusion unit 703, and a second feature extraction unit 704.

The first feature extraction unit 701 is configured to extract features of an image to be processed to obtain a first feature map of the image.

The attention extraction unit 702 is configured to generate an attention map of the image based on the first feature map.

The fusion unit 703 is configured to fuse the attention map and the first feature map to obtain a fusion map.

The second feature extraction unit 704 is configured to extract features of the image again based on the fusion map.

In some implementation modes of this embodiment, the attention extraction unit 702 may further include a downsampling module and an upsampling module not shown in FIG. 7.

The downsampling module is configured to sequentially perform downsampling processing on the first feature map N times, where N is an integer greater than or equal to 1.

The upsampling module is configured to sequentially perform upsampling processing on the feature map subjected to the $N^{th}$ downsampling processing N times to obtain the attention map of the image, where the resolution of the attention map is the same as that of the first feature map.

In some implementation modes of this embodiment, the upsampling module is configured to: perform a convolution operation on the feature map subjected to the $(N-n)^{th}$ downsampling processing and the feature map subjected to the $n^{th}$ upsampling processing, and perform the $(n+1)^t$ upsampling processing on the feature map subjected to the convolution operation to obtain the attention map of the image. Where, n is an integer greater than or equal to N.

In some implementation modes of this embodiment, the upsampling module is configured, when performing the convolution operation on the feature map subjected to the $(N-n)^{th}$ downsampling processing and the feature map subjected to the $n^{th}$ upsampling processing, to: perform convolution processing on the feature map subjected to the $(N-n)^{th}$ downsampling processing to obtain a convolution map; add the feature value of at least one pixel in the convolution map to the feature value of a corresponding pixel in the feature map subjected to the $n^{th}$ upsampling processing; and perform the convolution operation on the feature map subjected to the addition.

In some implementation modes of this embodiment, the upsampling module is configured to: perform at least one convolution operation on the feature map subjected to the $N^{th}$ downsampling processing; and perform the first upsampling processing on the feature map subjected to the last convolution operation to obtain the attention map of the image. In some implementation modes of this embodiment, the image processing apparatus 700 may further include a second convolution unit not shown in FIG. 7, which is configured to perform at least one convolution operation on the first feature map. Accordingly, the fusion unit 703 is configured to fuse the attention map and the first feature map subjected to the last convolution operation to obtain the fusion map.

In some implementation modes of this embodiment, the image processing apparatus 700 may further include a normalization unit not shown in FIG. 7, which is configured to perform normalization processing on the attention map. Accordingly, the fusion unit 703 is configured to fuse the attention map subjected to the normalization processing and the first feature map to obtain the fusion map.

In some implementation modes of this embodiment, the image processing apparatus 700 may further include a second convolution unit not shown in FIG. 7, which is configured to sequentially perform at least one convolution processing on the attention map. Accordingly, the normalization unit is configured to perform normalization processing on the attention map subjected to the last convolution processing.

In some implementation modes of this embodiment, the fusion unit 703 is further configured to: multiply a weight value of at least one pixel in the attention map subjected to the normalization processing by a feature value of a corresponding pixel in the first feature map to obtain the fusion map.

In some implementation modes of this embodiment, the fusion unit 703 is further configured to: multiply a weight value of at least one pixel in the attention map subjected to the normalization processing by a feature value of a corresponding pixel in the first feature map to obtain a multiplication map; and add the feature value of at least one pixel in the multiplication map to the feature value of the corresponding pixel in the first feature map to obtain the fusion map.

In some implementation modes of this embodiment, the image processing apparatus 700 further includes at least one of the following units not shown in FIG. 7: a detection unit, a classification unit, and a segmentation unit.

The detection unit is configured to detect or identify an object included in the image according to the features of the image extracted again.

The classification unit is configured to determine the category of the object included in the image according to the features of the image extracted again.

The segmentation unit is configured to segment the image according to the features of the image extracted again.

According to the image processing apparatus provided by the above embodiment, features of an image to be processed are extracted first, to obtain a first feature map of the image, an attention map of the image is generated based on the first feature map, the attention map and the first feature map are then fused, and finally, the features of the image are extracted again based on the fusion map, so that an attention mechanism is introduced into image processing, and the efficiency of acquiring information from the image is effectively improved.

The flowcharts and block diagrams in the accompanying drawings illustrate the architecture, functionality and operations of possible implementation modes of systems, methods, and computer program products according to at least one embodiment of the present disclosure. In this regard, each block in the flowchart of block diagrams may represent a portion of a module, program segment, or code, which includes one or more executable instructions for implementing the specified logical function(s). In some alternative implementation modes, it should also be noted that the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special hardware-based systems that perform the specified functions or operations or carried out by combinations of special hardware and computer instructions.

The description of units involved in the embodiments of the present disclosure may be implemented by means of software or by means of hardware. The described units may also be provided in a processor, for example, described as: a processor including a first feature extraction unit, an attention extraction unit, a fusion unit, and a second feature extraction unit. The names of these units do not constitute a limitation on the units themselves under certain circumstances. For example, the first feature extraction unit may also be described as "a unit for extracting features of an image to be processed to obtain a first feature map of the image".

In addition, the embodiments of the present disclosure further provide another electronic device, including: a processor and a memory. The memory is configured to store at least one executable instruction, and the executable instruction instructs the processor to execute operations corresponding to the image processing method according to any one of the foregoing embodiments.

Figure 8:
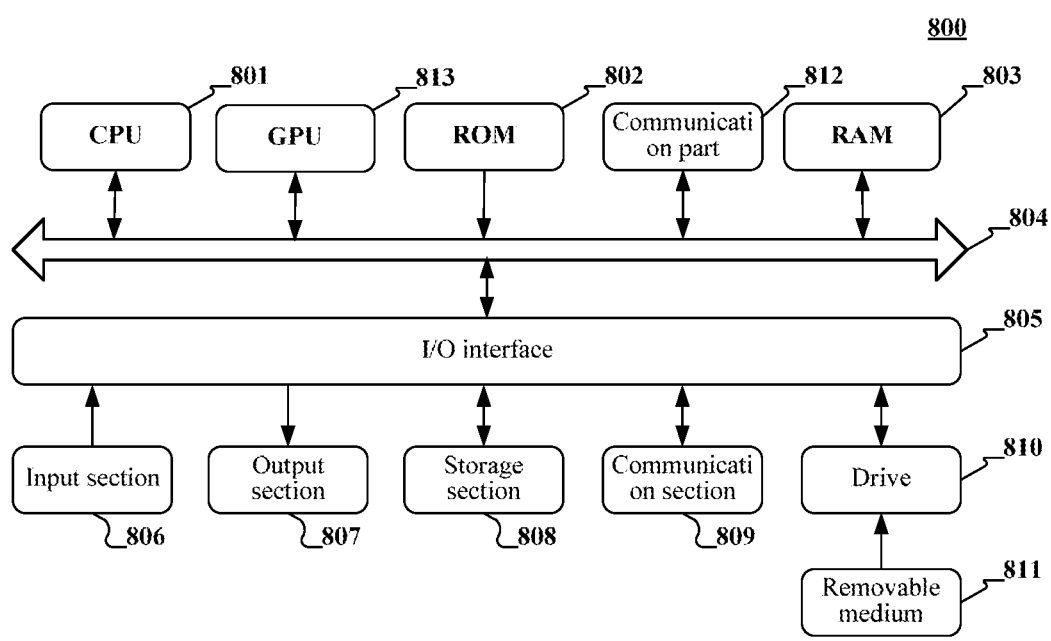
FIG. 8 is a schematic structural diagram of a computer system suitable for implementing a terminal device or a server according to an embodiment of the present disclosure.

The embodiments of the present disclosure further provide an electronic device which, for example, may be a mobile terminal, a Personal Computer (PC), a tablet computer, a server, and the like. Referring to FIG. 8 below, a schematic structural diagram of an electronic device 800, which may be a terminal device or a server suitable for implementing an embodiment of the present disclosure is shown. As shown in FIG. 8, the computer system 800 includes one or more processors, a communication part, and the like. The one or more processors are, for example, one or more Central Processing Units (CPUs) 801 and/or one or more Graphic Processing Units (GPUs) 813, and may execute at least one appropriate action and processing according to executable instructions stored in a Read-Only Memory (ROM) 802 or executable instructions loaded from a storage section 808 to a Random Access Memory (RAM) 803. The communication part 812 may include, but is not limited to, a network card. The network card may include, but is not limited to, an Infiniband (IB) network card.

The processor may be communicated with the ROM 802 and/or RAM 803 to execute the executable instructions and is connected to a communication part 812 by means of a bus 804 and communicated with other target devices by means of the communication part 812, so as to implement the operations corresponding to any method provided by the embodiments of the present disclosure, for example: extracting features of an image to be processed to obtain a first feature map of the image; generating an attention map of the image based on the first feature map; fusing the attention map and the first feature map to obtain a fusion map; and extracting the features of the image again based on the fusion map.

In addition, the RAM 803 may further store at least one program and data required for operations of an apparatus. The CPU 801, the ROM 802, and the RAM 803 are connected to each other via the bus 804. In the case that the RAM 803 exists, the ROM 802 is an optional module. The RAM 803 stores executable instructions, or writes the executable instructions into the ROM 802 during running, where the executable instructions cause the CPU 801 to execute corresponding operations of the foregoing communication method. An I/O interface 805 is also connected to the bus 804. The communication part 812 can be integrated, or is configured to have multiple sub-modules (for example, multiple IB network cards) connected to the bus 804.

The following components are connected to the I/O interface 805: an input section 806 including a keyboard, a mouse and the like; an output section 807 including a Cathode-Ray Tube (CRT), a Liquid Crystal Display (LCD), a speaker and the like; the storage section 808 including a hard disk and the like; and a communication section 809 of a network interface card including an LAN card, a modem and the like. The communication section 809 performs communication processing via a network such as the Internet. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be noted that the architecture illustrated in FIG. 8 is merely an optional implementation mode. During optional practice, the number and types of the components in FIG. 8 may be selected, decreased, increased, or replaced according to actual requirements. Different functional components may be separated or integrated or the like. For example, the GPU 813 and the CPU 801 may be separated, or the GPU 813 may be integrated on the CPU 801, and the communication part may be separated from or integrated on the CPU 801 or the GPU 813 or the like. These alternative implementation modes all fall within the scope of protection of the present disclosure.

Particularly, a process described above with reference to a flowchart according to the embodiments of the present disclosure is implemented as a computer software program. For example, the embodiments of the present disclosure include a computer program product, which includes a computer program tangibly contained in a machine-readable medium. The computer program includes a program code for executing a method illustrated in the flowchart. The program code may include corresponding instructions for correspondingly executing the operations of the methods provided by the embodiments of the present disclosure, for example, extracting features of an image to be processed to obtain a first feature map of the image; generating an attention map of the image based on the first feature map; fusing the attention map and the first feature map to obtain a fusion map; and extracting the features of the image again based on the fusion map. In such embodiments, the computer program is downloaded and installed from the network through the communication section 809, and/or is installed from the removable medium 811. When the computer program is executed by the CPU 801, the functions defined in the method according to the present disclosure are executed.

In addition, the embodiments of the present disclosure further provide a computer program, including a computer-readable code, where when the computer-readable code is run in a device, a processor in the device executes instructions for implementing the operations of the image processing method according to any one of the foregoing embodiments of the present disclosure.

In addition, the embodiments of the present disclosure further provide a computer-readable storage medium configured to store computer-readable instructions, where when the instructions are executed, the operations in the operations of the image processing method according to any one of the foregoing embodiments of the present disclosure are implemented.

The methods, apparatuses, and devices in the embodiments of the present disclosure are implemented in many manners. For example, the methods, apparatuses, and devices in the embodiments of the present disclosure are implemented with software, hardware, firmware, or any combination of software, hardware, and firmware. Unless otherwise specially stated, the foregoing optional sequences of steps of the methods are merely for description, and are not intended to limit the steps of the methods in the embodiments of the present disclosure. In addition, in some embodiments, the present disclosure may be implemented as programs recorded in a recording medium. The programs include machine readable instructions for implementing the methods according to the embodiments of the present disclosure. Therefore, the embodiments of present disclosure further cover recording media storing the programs for performing the methods according to the embodiments of the present disclosure.

The descriptions of the embodiments of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the embodiments of the present disclosure, and to make a person of ordinary skill in the art understand the embodiments of the present disclosure, so as to design at least one embodiment with at least one modification applicable to particular use.

The invention claimed is:

1. An image processing method, comprising:
   extracting features of an image to be processed to obtain a first feature map of the image;
   generating an attention map of the image based on the first feature map;
   fusing the attention map and the first feature map to obtain a fusion map; and
   extracting features of the image again based on the fusion map.

2. The method according to claim 1, wherein the generating an attention map of the image based on the first feature map comprises:
   sequentially performing downsampling processing on the first feature map N times, wherein N is an integer greater than or equal to 1; and
   sequentially performing upsampling processing on a feature map subjected to a $N^{th}$ downsampling processing N times to obtain the attention map of the image, wherein a resolution of the attention map is the same as that of the first feature map.

3. The method according to claim 2, wherein the sequentially performing upsampling processing on the feature map subjected to the $N^{th}$ downsampling processing N times comprises:
   performing a convolution operation on a feature map subjected to a $(N-n)^{th}$ downsampling processing and a feature map subjected to a $n^{th}$ upsampling processing, wherein n is an integer greater than 1 and less than N; and
   performing a $(n+1)^{th}$ upsampling processing on a feature map subjected to the convolution operation.

4. The method according to claim 3, wherein the performing a convolution operation on a feature map subjected to a $(N-n)^{th}$ downsampling processing and a feature map subjected to the $n^{th}$ upsampling processing comprises:
   performing convolution processing on the feature map subjected to the $(N-n)^{th}$ downsampling processing to obtain a convolution map;
   adding a feature value of at least one pixel in the convolution map to a feature value of a corresponding pixel in the feature map subjected to the $n^{th}$ upsampling processing; and
   performing the convolution operation on the feature map subjected to the addition.

5. The method according to claim 3, wherein the sequentially performing upsampling processing on the feature map subjected to the $N^{th}$ downsampling processing N times further comprises:
   performing at least one convolution operation on the feature map subjected to the $N^{th}$ downsampling processing; and
   performing a first upsampling processing on a feature map subjected to a last convolution operation.

6. The method according to claim 1, wherein the fusing the attention map and the first feature map to obtain a fusion map comprises:
   performing at least one convolution operation on the first feature map; and
   fusing the attention map and the first feature map subjected to the last convolution operation to obtain the fusion map.

7. The method according to claim 1, wherein the fusing the attention map and the first feature map to obtain a fusion map comprises:
   performing normalization processing on the attention map; and
   fusing the attention map subjected to the normalization processing and the first feature map to obtain the fusion map.

8. The method according to claim 7, wherein the performing normalization processing on the attention map comprises:
   sequentially performing at least one convolution processing on the attention map; and
   performing normalization processing on the attention map subjected to the last convolution processing.

9. The method according to claim 7, wherein the fusing the attention map and the first feature map to obtain a fusion map comprises:
   multiplying a weight value of at least one pixel in the attention map subjected to the normalization processing by a feature value of a corresponding pixel in the first feature map to obtain the fusion map.

10. The method according to claim 7, wherein the fusing the attention map and the first feature map to obtain a fusion map comprises:
    multiplying a weight value of at least one pixel in the attention map subjected to the normalization processing by a feature value of a corresponding pixel in the first feature map to obtain a multiplication map; and
    adding the feature value of at least one pixel in the multiplication map to the feature value of the corresponding pixel in the first feature map to obtain the fusion map.

11. The method according to claim 1, wherein after the extracting the features of the image again based on the fusion map, the method further comprises at least one of the following:
    detecting or identifying an object included in the image according to the features of the image extracted again;
    determining the category of the object included in the image according to the features of the image extracted again; and
    segmenting the image according to the features of the image extracted again.

12. An electronic apparatus, comprising:
    a processor; and
    a memory for storing instructions executable by the processor;
    wherein the processor executes the instructions to implement the following operations:
    extracting features of an image to be processed to obtain a first feature map of the image;
    generating an attention map of the image based on the first feature map;
    fusing the attention map and the first feature map to obtain a fusion map; and extracting features of the image again based on the fusion map.

13. The apparatus according to claim 12, wherein the operation of generating an attention map of the image based on the first feature map comprises:
sequentially performing downsampling processing on the first feature map N times, wherein N is an integer greater than or equal to 1; and
sequentially performing upsampling processing on a feature map subjected to a $N^{th}$ downsampling processing N times to obtain the attention map of the image, wherein a resolution of the attention map is the same as that of the first feature map.

14. The apparatus according to claim 13, wherein the operation of sequentially performing upsampling processing on the feature map subjected to the $N^{th}$ downsampling processing N times to obtain the attention map of the image comprises:
performing a convolution operation on a feature map subjected to the $(N-n)^{th}$ downsampling processing and a feature map subjected to a $n^{th}$ upsampling processing, wherein n is an integer greater than 1 and less than N; and
performing a $(n+1)^{th}$ upsampling processing on a feature map subjected to the convolution operation to obtain the attention map of the image.

15. The apparatus according to claim 14, wherein the operation of performing a convolution operation on a feature map subjected to a $(N-n)^{th}$ downsampling processing and a feature map subjected to the $n^{th}$ upsampling processing comprises:
performing convolution processing on the feature map subjected to the $(N-n)^{th}$ downsampling processing to obtain a convolution map;
adding the feature value of at least one pixel in the convolution map to the feature value of a corresponding pixel in the feature map subjected to the $n^{th}$ upsampling processing; and
performing the convolution operation on the feature map subjected to the addition.

16. The apparatus according to claim 14, wherein the operation of sequentially performing upsampling processing on the feature map subjected to the $N^{th}$ downsampling processing N times further comprises:
performing at least one convolution operation on the feature map subjected to the $N^{th}$ downsampling processing; and
performing a first upsampling processing on a feature map subjected to a last convolution operation to obtain the attention map of the image.

17. The apparatus according to claim 14, wherein the processor executes the instructions to implement at least one of the following:
detecting or identifying an object included in the image according to the features of the image extracted again;
determining the category of the object included in the image according to the features of the image extracted again; and
segmenting the image according to the features of the image extracted again.

18. The apparatus according to claim 12, wherein the operation of fusing the attention map and the first feature map to obtain a fusion map comprises:
performing at least one convolution operation on the first feature map; and
fusing the attention map and the first feature map subjected to the last convolution operation to obtain the fusion map;
or,
performing normalization processing on the attention map; and
fusing the attention map subjected to the normalization processing and the first feature map to obtain the fusion map.

19. The apparatus according to claim 18, wherein the operation of performing normalization processing on the attention map comprises:
sequentially performing at least one convolution processing on the attention map; and
performing normalization processing on the attention map subjected to the last convolution processing.

20. A non-transitory computer-readable storage medium, having computer instructions stored thereon, wherein execution of the computer-readable instructions by a processor causes the processor to implement:
extracting features of an image to be processed to obtain a first feature map of the image;
generating an attention map of the image based on the first feature map;
fusing the attention map and the first feature map to obtain a fusion map; and
extracting features of the image again based on the fusion map.

* * * * *